United States Patent
Kopiniok et al.

(10) Patent No.: US 11,685,424 B2
(45) Date of Patent: Jun. 27, 2023

(54) EDDY CURRENT BASED ROTARY DAMPER FOR STEER-BY-WIRE FEEDBACK ACTUATOR

(71) Applicant: Ford Global Technologies, LLC, Dearborn, MI (US)

(72) Inventors: Martin Robert Kopiniok, Vettweiß (DE); Alexander Ein Waldt, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 610 days.

(21) Appl. No.: 16/830,542

(22) Filed: Mar. 26, 2020

(65) Prior Publication Data
US 2020/0307676 A1    Oct. 1, 2020

(30) Foreign Application Priority Data

Mar. 26, 2019   (DE) ................. 10 2019 204 179.5

(51) Int. Cl.
*B62D 5/00* (2006.01)
*B62D 6/00* (2006.01)
*H02K 49/04* (2006.01)

(52) U.S. Cl.
CPC ............. *B62D 5/006* (2013.01); *B62D 6/008* (2013.01); *H02K 49/04* (2013.01)

(58) Field of Classification Search
CPC ......... B62D 5/006; B62D 6/008; H02K 49/04
See application file for complete search history.

(56) References Cited

U.S. PATENT DOCUMENTS

| | | | | |
|---|---|---|---|---|
| 5,044,956 A * | 9/1991 | Behensky | ................ | G09B 9/04 434/45 |
| 6,253,887 B1 * | 7/2001 | Frank | .................... | B60T 13/585 188/197 |
| 6,523,650 B1 * | 2/2003 | Pribonic | ................... | B60L 7/28 188/165 |
| 6,918,469 B1 * | 7/2005 | Pribonic | ................... | B60L 7/28 188/165 |
| 7,726,208 B2 * | 6/2010 | Hoeller | .................... | G01L 3/104 73/862.331 |
| 8,380,397 B2 * | 2/2013 | Foster | ................ | G01D 5/34776 701/30.6 |
| 2008/0150519 A1 * | 6/2008 | Hoeller | ................... | G01L 3/104 73/862.331 |
| 2010/0324778 A1 * | 12/2010 | Foster | ................ | G01D 5/34776 701/29.2 |
| 2017/0313341 A1 * | 11/2017 | Hoggarth | ................... | B62D 1/06 |
| 2018/0237056 A1 * | 8/2018 | Bremkens | ................ | B62D 6/10 |

FOREIGN PATENT DOCUMENTS

| | | | | |
|---|---|---|---|---|
| DE | 102007000588 A1 * | 5/2009 | ............. | B62D 5/008 |
| ES | 2897907 T3 * | 3/2022 | ............. | B60T 13/08 |
| JP | 07194091 A * | 7/1995 | | |
| KR | 2002074651 A * | 10/2002 | | |
| WO | WO-2020104510 A1 * | 5/2020 | | |

* cited by examiner

*Primary Examiner* — Jacob D Knutson
*Assistant Examiner* — Michael R Stabley
(74) *Attorney, Agent, or Firm* — Burr and Forman LLP; Lorne Forsythe

(57) ABSTRACT

An eddy current brake for a steer-by-wire steering system of a vehicle that includes a steering wheel may include magnets and a magnet carrier. The eddy current brake may be connected in a force-transmitting manner to an axle to which the steering wheel is connected, and to the steering wheel, in a force-transmitting manner.

13 Claims, 2 Drawing Sheets

EDDY CURRENT BASED ROTARY DAMPER FOR STEER-BY-WIRE FEEDBACK ACTUATOR

TECHNICAL FIELD

Figure 1:
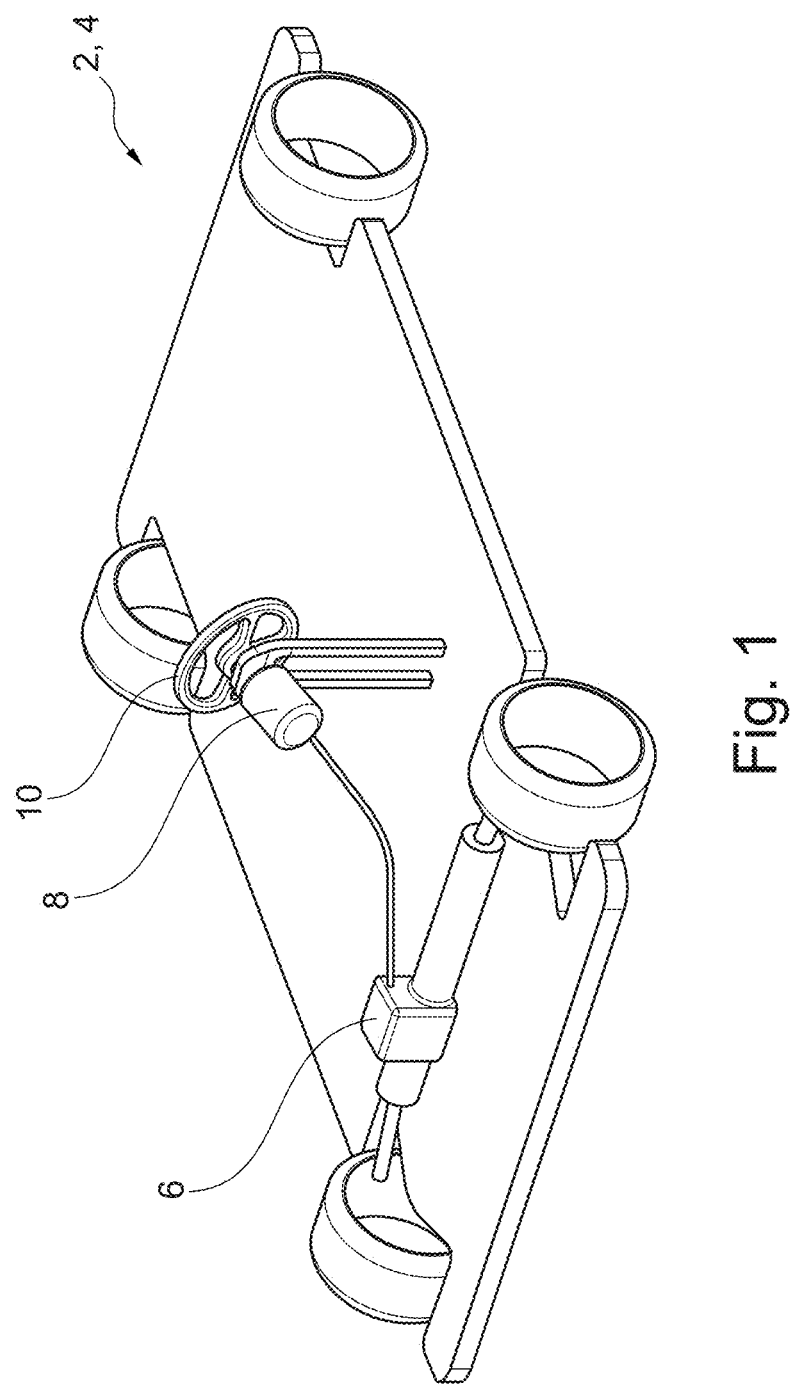

Example embodiments generally relate to steering systems and, more particularly, relate to a steer-by-wire steering system.

BACKGROUND

A steer-by-wire steering system is in this instance intended to be understood to be a system in which a steering command is transmitted from a sensor via a control device exclusively electrically to a servomotor which converts the steering command. In such a steer-by-wire steering system, there is no mechanical connection between a steering wheel and steered wheels of the motor vehicle. The steer-by-wire steering system generally has two actuators. The steering wheel actuator in this instance performs the tasks of measuring the steering command—expressed through the steering wheel angle—with a sensor and further transmitting to the driver via a servo-motor a speed information item relevant to the travel situation. The axle actuator receives the steering command from the steering wheel actuator and moves via another servo-motor into the desired position.

During normal operation, the control device of the steering wheel actuator calculates, based on various input signals, a steering wheel torque which is intended to be adjusted and which is produced via the servo-motor of the steering wheel actuator. This steering wheel torque contains in particular feedback to the driver relating to the respective travel situation and a damping in order to prevent undesirable and excessively rapid steering movements and consequently to ensure at all times proper control of the vehicle.

Such a steer-by-wire steering system is known, for example, from US 2018/073590 A1.

However, an interruption of a force-transmitting connection, for example, a torn flexible drive member (e.g., drive-belt), may lead to there no longer being any feedback for the driver. Thus, the steering wheel can then freely rotate, which significantly limits the controllability of the motor vehicle for a driver. In addition, the comfort function of support on the steering wheel for entry and exit to/from the vehicle is only available to a very limited extent.

U.S. Pat. No. 7,726,208 discloses a no-load current damping for a steering system, whilst U.S. Pat. No. 7,594,563 B discloses a rotary damper. U.S. Pat. No. 5,044,956 A further discloses a method for simulating a force acting on a steering wheel. Finally, from US 2003/230 448 A it is known to partially electrically short-circuit the servo-motor in the event of issues arising that impact operational capabilities.

In view of these and other references that represent the state of the art, steer-by-wire steering systems still leave room for improvement.

BRIEF SUMMARY OF SOME EXAMPLES

Some example embodiments may provide a steer-by-wire steering system for a motor vehicle, having an eddy current brake which is connected in a force-transmitting manner to a steering wheel of the steer-by-wire steering system.

In accordance with an example embodiment, the eddy current brake is connected in a force-transmitting manner to an axle to which the steering wheel is connected in a force-transmitting manner. In other words, the steering wheel is connected to the eddy current brake directly in a force-transmitting manner—without flexible driving members (e.g., drive-belts) or gear mechanisms being interposed. The number of components which could be compromised during operation is thus minimized, which further increases the operational reliability of the vehicle.

In another example embodiment, a gear mechanism is provided in a force-transmitting manner between the eddy current brake and an axle, wherein the steering wheel is connected in a force-transmitting manner to the axle. The efficiency of the eddy current brake can thus be increased, for example, by a speed increase.

According to another example embodiment, magnets of the eddy current brake are connected to the axle in a force-transmitting manner. The magnets may be permanent magnets which in contrast to solenoids require no operating energy. As a result of the force-transmitting connection of the magnets to the axle, it is ensured that the magnets are also moved during steering movements. In contrast to this, the magnets may also be arranged in a fixed manner with respect to the housing, whilst a non-ferromagnetic metal disk is connected in a force-transmitting manner to the rotation axle.

According to another example embodiment, at least two metal disks are provided in front of and behind the magnet carrier, respectively, or a plurality of metal disks and a plurality of magnet carriers are provided in a row one behind the other. In this instance, at least the two metal disks are arranged one behind the other with the magnet carrier or the plurality of metal disks and the plurality of magnet carriers in the extent direction of the axle. The efficiency can thus be increased again.

According to another example embodiment, a plurality of magnets are arranged along a periphery of a magnet carrier of the steer-by-wire steering system with changing polarity in each case. In other words, it changes the polarity from one magnet to the next adjacent magnet in the peripheral direction. A compact eddy current brake which takes up a particularly small amount of structural space can thus be provided.

According to another example embodiment, a housing of the eddy current brake is constructed in such a manner that eddy currents which bring about a braking action are induced in the housing. In other words, the housing of the eddy current brake additionally performs the function of a metal disk of a known eddy current brake. The structure of the eddy current brake can thus be further simplified.

According to another example embodiment, a steering angle sensor is provided to detect magnetic fields of magnets of the eddy current brake. Consequently, another source of steering movements of the steering wheel is provided, which increases the redundancy. As a result of combined evaluation of two steering angle sensors, an absolute angle can also be determined.

BRIEF DESCRIPTION OF THE SEVERAL VIEWS OF THE DRAWING(S)

Figure 2:
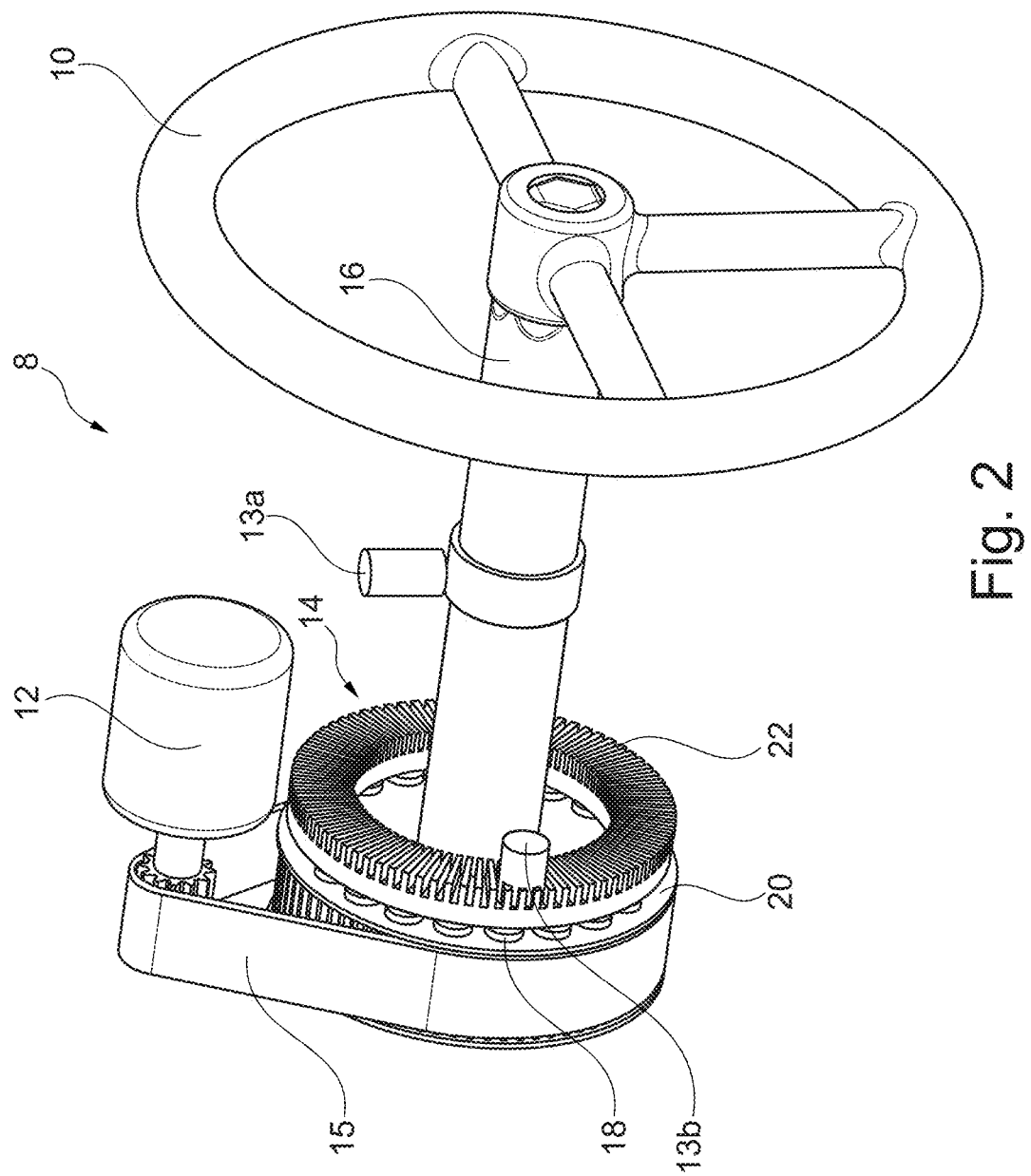

Having thus described the invention in general terms, reference will now be made to the accompanying drawings, which are not necessarily drawn to scale, and wherein:

FIG. 1 illustrates a schematic illustration of components of a steer-by-wire steering system of a motor vehicle in accordance with an example embodiment; and FIG. 2 illustrates a schematic illustration of an eddy current brake for the steer-by-wire steering system shown in FIG. 1 in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

As used herein, an eddy current brake is intended to be understood to be a contactless and therefore wear-free brake which uses electrical eddy current induced by magnetic fields in order to produce a brake force. It is therefore possible to brake an otherwise freely rotating steering wheel in a particularly simple and reliable manner, which increases the operability or the controllability in the event of the steering wheel actuator becoming non-operational and the comfort when entering and leaving the car.

In reference to FIG. 1, some components of a motor vehicle 2, which in the present embodiment is a passenger vehicle, are illustrated. The motor vehicle 2 has a steer-by-wire steering system 4. The steer-by-wire steering system 4 comprises an illustrated axle actuator 6 and a steering wheel actuator 8.

Referring now to FIG. 2, the steering wheel actuator 8 may have a steering angle sensor 13a) for detecting a steering movement of a steering wheel 10. A control device (not illustrated) of the steer-by-wire steering system 4 reads the detected steering command and controls a servo-motor 12 of the steering wheel actuator 8 in order to thus inform the driver with a suitable steering wheel torque regarding the travel state of the motor vehicle 2 and to prevent undesirable steering movements. Furthermore, the axle actuator 6, which has an additional servo-motor (not illustrated), is moved with electrical energy from a voltage source into a position defined by the steering command in order to move steered wheels of the motor vehicle 2 into the desired position.

There is further illustrated an eddy current brake 14 which is associated with the steer-by-wire steering system 4. Of the components of the eddy current brake 14, magnets 18, a magnet carrier 20 and a metal disk 22 are illustrated in FIG. 2.

The magnet carrier 20 is directly connected to the axle 16, which is securely connected to the steering wheel 10. The magnet carrier 20 carries a plurality of magnets 18, which in the present embodiment are permanent magnets.

The plurality of magnets 18 are arranged in a peripheral direction of the substantially disk-like magnet carrier 20 in such a manner that, starting from one magnet 18 to the directly adjacent magnet 18, the polarity thereof changes. In other words, the magnets 18 are arranged in the peripheral direction with alternatingly changing polarity.

The metal disk 22 may be arranged with a small predetermined spacing in the extent direction of the axle 16 from the magnet carrier 20 with the magnets 18.

During normal operation, the servo-motor 12 generates, via flexible driving member 15 (e.g., a drive-belt), a torque counter to the rotation direction of a steering movement. In place of the flexible driving member 15, another gear mechanism construction type may also be provided, for example, a worm or planet gear. This steering movement via the steering wheel 10 about the axle 16 is now additionally braked by the eddy current brake 14 in the rotation direction of the servo-motor 12. This is brought about by rotational movement of the magnet carrier 20 with the magnets 18. As a result of the temporally changing magnetic field, which is provided by the magnets 18, electrical eddy currents are now induced in the metal disk 22. The metal disk 22 can also be integrated directly in a housing or even be part of the housing. The electrical eddy currents in turn bring about magnetic fields which are opposed to the magnetic fields of the magnets 18. There is thus provided, in a contactless manner, a magnetic braking force which brakes the steering wheel 10 using passively induced eddy currents.

The same active direction of the torque from the eddy current brake 14 and servo-motor 12 enable a reduction of the power and consequently the structural space of the servo-motor 12.

It is thus possible to brake in a particularly simple and reliable manner an otherwise freely rotating steering wheel 10, which increases the controllability in the event of the servo-motor 12 and the flexible driving member 15 experiencing issues limiting operability thereof, and which also provides comfort to the operator during entry and exit when the steering wheel 10 is used as an auxiliary support means. An additional steering angle sensor 13b may further be provided in order to detect magnetic fields of magnets 18 of the eddy current brake 14.

Consequently, the additional steering angle sensor 13b detects an angular position of the eddy current brake 14 by detecting magnetic fields of the magnets 18 which are arranged in the magnet carrier 20, whilst the first steering angle sensor 13a detects the angular position of the axle 16. A redundancy during the detection of the angular position may therefore be achieved.

There may be provision using a gear mechanism between the servo-motor 12 and steering axle 16 for an absolute angle information item to be provided. The gear mechanism may have a translation ratio which corresponds to a real and positive number which is a non-integer. Consequently, it is possible to use the rotor position sensor of the servo-motor 12 and the angle sensors 13a and/or 13b in order through combined evaluation of these two variables to be able to determine an absolute value of the steering angle. This enables a conventional, separate absolute angle value encoder to be dispensed with.

Thus, according to an example embodiment, an eddy current brake for a steer-by-wire steering system of a vehicle that includes a steering wheel may be provided. The eddy current brake may include magnets and a magnet carrier. The eddy current brake may be connected in a force-transmitting manner to an axle to which the steering wheel is connected, and to the steering wheel, in a force-transmitting manner.

The eddy current brake of some embodiments may include additional features, modifications, augmentations and/or the like to achieve further objectives or enhance effectiveness of the eddy current brake. Similarly, vehicle or steer-by-wire steering system comprising the eddy current brake described above may include additional features, modifications, augmentations and/or the like. The additional features, modifications, augmentations and/or the like may be added in any combination with each other. Below is a list of various additional features, modifications, and augmentations that can each be added individually or in any combination with each other. For example, a gear mechanism may be provided in a force-transmitting manner between the eddy current brake and the axle. In an example embodiment, magnets of the eddy current brake may be connected to the axle in a force-transmitting manner. In some cases, the magnets may be arranged along a periphery of the magnet carrier with changing polarity in each case. In an example embodiment, at least two metal disks may be provided in front of and behind the magnet carrier, respectively. In some cases, a plurality of metal disks and a plurality of magnet carriers may be provided in a row one behind the other. In an example embodiment, a housing of the eddy current brake may be constructed in such a manner that eddy currents which bring about a braking action are induced in the housing. In some cases, a steering angle sensor may be provided to detect magnetic fields of the magnets of the eddy current brake.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A steer-by-wire steering system for a motor vehicle, the system comprising:
    a steering wheel; and
    an eddy current brake connected in a force-transmitting manner to the steering wheel;
    wherein a plurality of magnets are arranged along a periphery of a magnet carrier of the steer-by-wire steering system with alternatingly changing polarity for each adjacent one of the magnets;
    wherein a plurality of metal disks and a plurality of magnet carriers are provided in a row one behind the other.

2. The steer-by-wire steering system of claim 1, wherein the eddy current brake is connected in a force-transmitting manner to an axle to which the steering wheel is connected in a force-transmitting manner.

3. The steer-by-wire steering system of claim 1, wherein a gear mechanism is provided in a force-transmitting manner between the eddy current brake and an axle of the motor vehicle.

4. The steer-by-wire steering system of claim 3, wherein magnets of the eddy current brake are connected to the axle in a force-transmitting manner.

5. The steer-by-wire steering system of claim 1, wherein a housing of the eddy current brake is constructed in such a manner that eddy currents which bring about a braking action are induced in the housing.

6. The steer-by-wire steering system of claim 1, wherein a steering angle sensor is provided to detect magnetic fields of magnets of the eddy current brake.

7. A steer-by-wire steering system for a motor vehicle, the system comprising:
    a steering wheel; and
    an eddy current brake connected in a force-transmitting manner to the steering wheel;
    wherein a plurality of magnets are arranged along a periphery of a magnet carrier of the steer-by-wire steering system with alternatingly changing polarity for each adjacent one of the magnets;
    wherein at least two metal disks are provided in front of and behind the magnet carrier, respectively.

8. An eddy current brake for a steer-by-wire steering system of a vehicle that includes a steering wheel, the eddy current brake comprising magnets and a magnet carrier,
    wherein the eddy current brake is connected in a force-transmitting manner to an axle to which the steering wheel is connected, and to the steering wheel, in a force-transmitting manner;
    wherein the magnets are arranged along a periphery of the magnet carrier with alternatingly changing polarity for each adjacent one of the magnets;
    wherein a plurality of metal disks and a plurality of magnet carriers are provided in a row one behind the other.

9. The eddy current brake of claim 8, wherein a gear mechanism is provided in a force-transmitting manner between the eddy current brake and the axle.

10. The eddy current brake of claim 9, wherein magnets of the eddy current brake are connected to the axle in a force-transmitting manner.

11. The eddy current brake of claim 8, wherein at least two metal disks of the plurality of metal disks are provided in front of and behind the magnet carrier, respectively.

12. The eddy current brake of claim 8, wherein a housing of the eddy current brake is constructed in such a manner that eddy currents which bring about a braking action are induced in the housing.

13. The eddy current brake of claim 8, wherein a steering angle sensor is provided to detect magnetic fields of the magnets of the eddy current brake.

* * * * *